United States Patent
Liu et al.

(10) Patent No.: US 9,512,845 B2
(45) Date of Patent: Dec. 6, 2016

(54) POSITIVE AND NEGATIVE ROTATION CONTROL CIRCUIT AND FAN SYSTEM

(71) Applicant: ANPEC ELECTRONICS CORPORATION, Hsinchu (TW)

(72) Inventors: Yi-Cheng Liu, New Taipei (TW); Kun-Min Chen, Hsinchu (TW); Ching-Sheng Li, Hsinchu County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 129 days.

(21) Appl. No.: 14/656,841

(22) Filed: Mar. 13, 2015

(65) Prior Publication Data

US 2016/0186760 A1   Jun. 30, 2016

(30) Foreign Application Priority Data

Dec. 26, 2014 (TW) .............................. 103145762 A (51) Int. Cl.
*F04D 15/00* (2006.01)
*H02P 23/00* (2016.01)
*F04D 27/00* (2006.01)

(52) U.S. Cl.
CPC .............. *F04D 15/00* (2013.01); *F04D 27/004* (2013.01); *H02P 23/24* (2016.02)

(58) Field of Classification Search
CPC .......... H02P 6/10; H02P 25/024; H02P 6/08; H02P 6/16; H02P 6/182; H02P 6/085; G06F 1/3203; G06F 1/3209; G06F 1/3221; G06F 3/0625; G06F 3/0634; G06F 3/0689; G06F 1/206; Y02B 60/1246; Y02B 30/767
USPC ........................ 318/739, 400.01, 400.04, 432
See application file for complete search history.

(56) References Cited

U.S. PATENT DOCUMENTS

| | | | | |
|---|---|---|---|---|
| 6,512,343 B1* | 1/2003 | Yasohara | ........... | H02P 6/10 318/400.01 |
| 7,304,452 B2* | 12/2007 | Nagai | ........... | H02P 25/024 318/432 |
| 9,035,582 B2* | 5/2015 | Yamato | ........... | H02P 6/08 318/400.04 |
| 2006/0248324 A1* | 11/2006 | Fung | ........... | G06F 1/3203 713/1 |
| 2006/0248359 A1* | 11/2006 | Fung | ........... | G06F 1/3203 713/300 |
| 2006/0290312 A1* | 12/2006 | Nagai | ........... | H02P 25/024 318/599 |
| 2007/0082601 A1* | 4/2007 | Desrochers | ........... | F24F 3/044 454/256 |
| 2007/0240003 A1* | 10/2007 | Watts | ........... | G06F 1/206 713/322 |
| 2012/0262097 A1* | 10/2012 | Yamato | ........... | H02P 6/08 318/400.04 |

* cited by examiner

*Primary Examiner* — Paul Ip
(74) *Attorney, Agent, or Firm* — Li & Cai Intellectual Property (USA) Office (57) ABSTRACT

The present disclosure provides a positive and negative rotation control circuit and fan system, which can positively or negatively rotate a fan motor according to an end connecting to different external components or being floating. When the end generates an oscillatory fan signal, the positive and negative rotation control circuit negatively rotates the fan motor for a period of time after the positive and negative rotation control circuit is started for a delay time, to execute the operation of exhausting the accumulated dust, so that a fan connecting to the fan motor may exhaust the accumulated dust from an electronic device. Then the control circuit positively rotates the fan motor to execute the operation of dissipating heat, so that the fan may dissipate heat in the situation of having less dust within the electronic device. Accordingly, the heat dissipation effect of the fan may be enhanced.

10 Claims, 8 Drawing Sheets

POSITIVE AND NEGATIVE ROTATION CONTROL CIRCUIT AND FAN SYSTEM

BACKGROUND

1. Technical Field

The present disclosure relates to a positive and negative rotation control circuit and a fan system, in particular, to a positive and negative rotation control circuit and a fan system, which rotate a fan motor configured in the fan system along a predefined rotation direction for a period of time after starting the fan system, and then rotate the fan motor along the reverse direction of the predefined rotation direction.

2. Description of Related Art

The fan motor plays an important role in the development of automation technology adapted for the fan. Due the fan motor rotating the fan to produce air flow, the fan configured in an electronic device can effectively dissipate heat generated from the electronic device.

In the heat dissipation operation of the fan, the fan is rotated along a predefined rotation direction to lead the external air flow into the electronic device to dissipate heat. However, due to the amount of external air flowing into the electronic device, dust is easily accumulated in the internal electronic device, so that the electronic device has bad heat dissipation effect.

Therefore, if the operation of exhausting the accumulated dust is executed in the internal electronic device, it may enhance the heat dissipation effect of the fan.

To address the above issues, the inventor strives via associated experience and research to present the instant disclosure, which can effectively improve the limitation described above.

SUMMARY

An exemplary embodiment of the instant disclosure provides a positive and negative rotation control circuit, which is started based on a start signal, and then configured for controlling a fan motor after being started for a delay time. The positive and negative rotation control circuit includes an oscillation circuit, an input stage circuit, a switching circuit, and a driving circuit. The oscillation circuit has an end connecting an external component or being floating. The oscillation circuit is configured for generating a fan signal at the end to transform the fan signal to a clock signal. The input stage circuit is electrically connected to the end of the oscillation circuit. The input stage circuit is configured for generating a voltage signal based on the voltage level of the fan signal. The switching circuit is electrically connected to the oscillation circuit and the input stage circuit, to output a control signal according to the voltage signal and the clock signal. When the switching circuit receives the voltage signal indicating a first logic, it outputs the control signal indicating positively rotating the fan motor. When the switching circuit receives the voltage signal indicating a second logic, it determines whether the clock signal is an oscillation signal. When the clock signal is the oscillation signal, the switching circuit generates the control signal indicating to negatively rotate the fan motor for a reverse time, and then generating the control signal indicating to positively rotate the fan motor after the reverse time. The driving circuit is electrically connected to the switching circuit, and configured for positively or negatively rotating the fan motor after the delay time according to the control signal.

An exemplary embodiment of the instant disclosure provides a fan system. The fan system has a fan motor and the aforementioned positive and negative rotation control circuit. The fan motor is configured for driving a fan. The positive and negative rotation control circuit is configured for outputting the control signal, to positively or negatively rotate the fan motor after the delay time.

To sum up, the exemplary embodiments of the instant disclosure provide a positive and negative rotation control circuit and a fan system, which can positively or negatively rotate a fan motor according to an end connecting a different external component or being floating. Especially, when the end generates an oscillatory fan signal, the positive and negative rotation control circuit negatively rotates the fan motor for a period of time after the positive and negative rotation control circuit is started for a delay time, to execute the operation of exhausting the accumulated dust, so that a fan connecting to the fan motor may exhaust the accumulated dust from an electronic device. Then the positive and negative rotation control circuit positively rotates the fan motor to execute the operation of dissipating heat, so that the fan may dissipate heat in the situation of having less dust within the electronic device. Accordingly, the positive and negative rotation control circuit may enhance the heat dissipation effect of the fan.

In order to further understand the techniques, means and effects of the present disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the instant disclosure, examples of which are illustrated in the accompanying drawings. However, they may be embodied in different forms and should not be construed as being limited to the embodiments set forth herein. Wherever possible, the same reference numbers are used in the drawings and the description to refer to the same or like parts.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and could be termed a second element, component, region, layer or section without departing from the teachings of the present disclosure. As used herein, the term "and/or" includes any and all combinations of one or more of the associated listed items.

Figure 1:
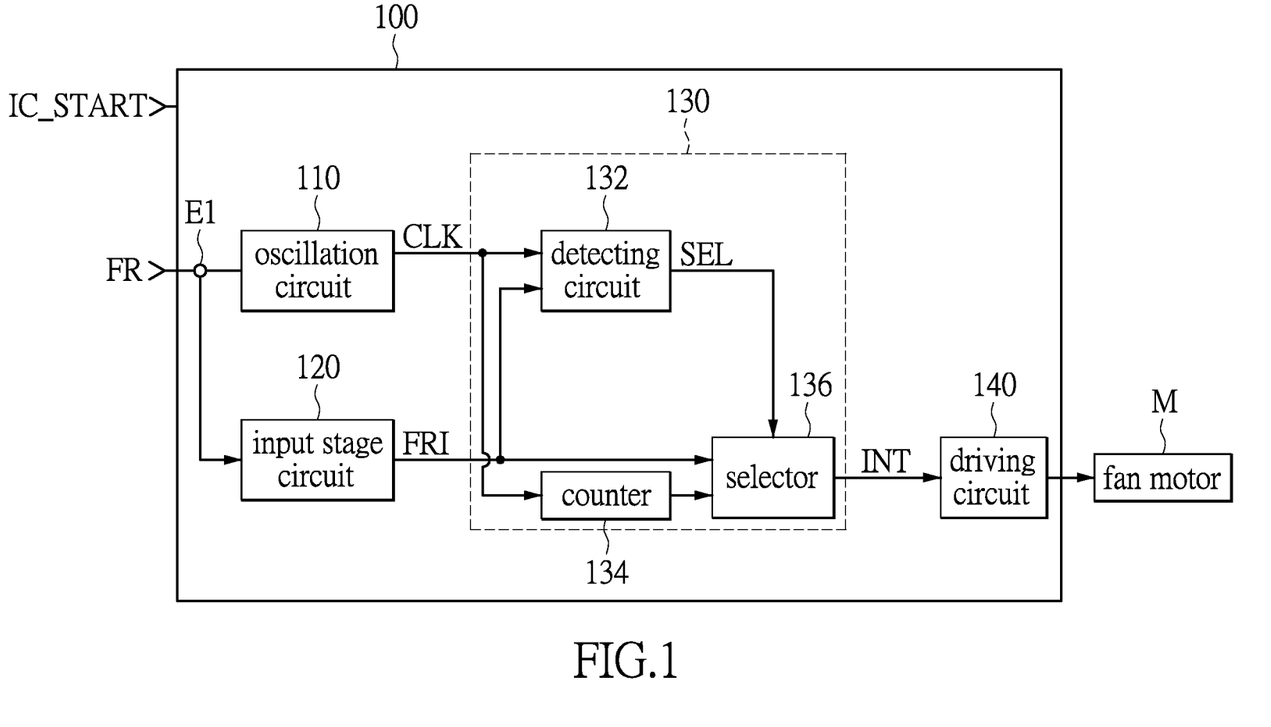
FIG. 1 is a diagram of a positive and negative rotation control circuit according to an exemplary embodiment of the instant disclosure.

Firstly, please refer to FIG. 1, which shows a diagram of a positive and negative rotation control circuit according to an exemplary embodiment of the instant disclosure. As shown in FIG. 1, the positive and negative rotation control circuit 100 is started based on a start signal IC_START, and then controls a fan motor M to operate after a delay time. For example, the start signal IC_START shown in FIG. 5, which indicates that the positive and negative rotation control circuit 100 is started and then controls a fan motor M to operate after a delay time DL_TIME. The fan motor M connects to the fan configured in the electronic device (not shown in FIGS.). Therefore, when the fan motor M operates to drive the fan, it can dissipate heat generated from the electronic device.

The positive and negative rotation control circuit 100 includes an oscillation circuit 110, an input stage circuit 120, and a switching circuit 130. The oscillation circuit 110 has an end E1. The end E1 electrically connects to an external element or is floating. The oscillation circuit 110 generates a fan signal FR at the end E1, to transform the fan signal FR into a clock signal CLK. In the instant disclosure, the external element can be a capacitor, a power supply outputting a supply voltage, a ground outputting a ground voltage, or other external element generating the voltage signal, and the instant disclosure is not limited thereto. With respect to operation of the positive and negative rotation control circuit 100 while the end E1 is connecting to the capacitor, the power supply, the ground, or floating are described in a later embodiment, and further descriptions are hereby omitted.

Figure 2:
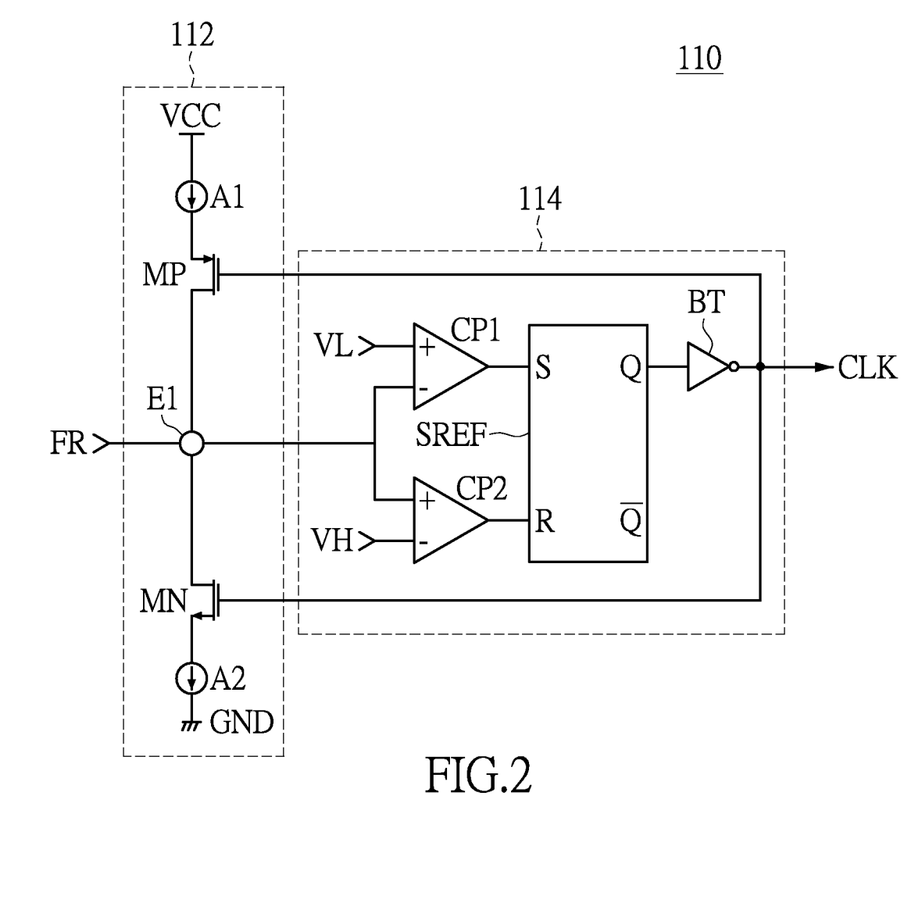
FIG. 2 is a diagram of an oscillation circuit according to an exemplary embodiment of the instant disclosure.

More specifically, please refer to FIG. 2, which shows a diagram of an oscillation circuit according to an exemplary embodiment of the instant disclosure. As shown in FIG. 2, the oscillation circuit 110 includes a charge-discharge circuit 112 and a clock generator 114. The charge-discharge circuit 112 electrically connects the clock generator 114. The charge-discharge circuit 112 has a charging element and a discharging element. The end E1 is configured between the charging element and the discharging element. The charge-discharge circuit 112 charges or discharges the external component through the end E1 to generate the fan signal FR at the end E1. In the instant disclosure, the charging element has a P-type transistor MP and the discharging element has an N-type transistor MN. One end of the P-type transistor MP electrically connects to a supply voltage VCC through a first current source A1. Another end of the P-type transistor MP electrically connects to one end of the N-type transistor MN to form the end E1. Another end of the N-type transistor MN electrically connects to a ground voltage GND through a second current source A2. The control end of the P-type transistor MP and the control end of the N-type transistor MN receive a logic voltage generated from the clock generator 114 and are controlled by the logic voltage. Therefore, when the logic voltage is low voltage, the P-type transistor MP is turned on and the N-type transistor MN is turned off, so that the first current source A1 charges the end E1. When the logic voltage is high voltage, the P-type transistor MP is turned off and the N-type transistor MN is turned on, so that the second current source A2 discharges the end E1.

Therefore, when the external element is a capacitor, the charge-discharge circuit 112 charges the capacitor according to the logic voltage generated from the clock generator 114, so that the fan signal FR of the end E1 is an oscillation signal. Furthermore, when the external element is a power supply outputting a supply voltage VCC, the fan signal FR of the end E1 continues to be the supply voltage VCC. Furthermore, when the external element is a ground outputting a ground voltage GND, the fan signal FR of the end E1 continues to be the ground voltage GND. Besides, when the end E1 is floating (i.e., the end E1 connects without any external element), the end E1 has a parasitic capacitance. Therefore, the charge-discharge circuit 112 charges or discharges the parasitic capacitance according to the logic voltage generated from the clock generator 114, so that the fan signal FR of the end E1 has the higher oscillation frequency, which is much higher than the oscillation frequency of the fan signal FR when the external element is the capacitor.

Please return to FIG. 2. The clock generator 114 receives the fan signal FR to accordingly generate the clock signal CLK. In the instant disclosure, the clock generator 114 has a first comparator CP1, a second comparator CP2, SR flip-flop SRFF, and NOT gate BT. The non-inverting input terminal of the first comparator CP1 electrically connects to a low-voltage VL. The inverting input terminal of the first comparator CP1 and the non-inverting input terminal of the second comparator CP2 electrically connect to the end E1. The inverting input terminal of the second comparator CP2 electrically connects to a high-voltage VH. The output terminals of the first comparator CP1 and the second comparator CP2 respectively and electrically connect to the set terminal and the reset terminal of the SR flip-flop SRFF. The output terminal of the SR flip-flop SRFF electrically connects to the switching circuit 130 through the NOT gate BT. The output terminal of the NOT gate BT electrically connects to the control terminal of the P-type transistor MP and N-type transistor MN, to turn on or turn off the P-type transistor MP and the N-type transistor MN according to the logic voltage outputted from the output terminal of the NOT gate BT (i.e., the clock signal CLK). Accordingly, the clock generator 114 determines the logic level of the fan signal FR, to generate the clock signal CLK to the switching circuit 130.

As in the aforementioned example, when the external element is the capacitor, the clock generator 114 outputs the square wave as the clock signal CLK based on the oscillatory fan signal FR. When the external element is the power supply, the clock generator 114 outputs the supply voltage VCC as the clock signal CLK based on the fan signal FR with the high-voltage. When the external element is ground, the clock generator 114 outputs the ground voltage GND as the clock signal CLK based on the fan signal FR with the low-voltage. When the end E1 is floating, the clock generator 114 outputs the high-frequency square wave as the clock signal CLK based on the fan signal FR with the high-frequency.

The oscillation circuit 110 can also be another circuit structure. The end E1 can generate the oscillatory fan signal FR for a period of time, or the supply voltage VCC, or the ground voltage GND without the oscillation circuit 110, the oscillation circuit 110 can be omitted. The instant disclosure is not limited thereto.

Please return to FIG. 1, the input stage circuit 120 electrically connects to the end E1 of the oscillation circuit 110, and generates a voltage signal FRI according to the voltage level of the fan signal FR. More specifically, the input stage circuit 120 has a predefined voltage level (not shown in FIGS.) to output the voltage signal FRI indicating the first logic or the second logic based on the voltage level of the fan signal FR. For example, the predefined voltage level is 5V. Therefore, when the fan signal FR is higher than or equal to 5V, the input stage circuit 120 generates the voltage signal FRI with the high-voltage (i.e., the first logic). When the fan signal FR is lower than 5V, the input stage circuit 120 generates the voltage signal FRI with the low-voltage (i.e., the second logic). In the instant disclosure, the input stage circuit 120 is a Schmitt trigger. The input stage circuit 120 can be another circuit determining the logic level, and it is not limited thereto.

The switching circuit 130 electrically connects to the oscillation circuit 110 and the input stage circuit 120, to output a control signal INT according to the voltage signal FRI and the clock signal CLK. When the switching circuit 130 receives the voltage signal FRI indicating the first logic, the switching circuit 130 outputs the control signal INT indicating positively rotating the fan motor M to the driving circuit 140. When the switching circuit 130 receives the voltage signal FRI indicating the second logic, the switching circuit 130 determines whether the clock signal CLK is an oscillation signal (as the clock signal CLK shown in FIG. 5 and FIG. 8). When the clock signal CLK is not the oscillation signal, the switching circuit 130 generates the control signal INT indicating negatively rotating the fan motor M for a reverse time (as the reverse time NR_TIME shown in FIG. 5 and FIG. 8) to the driving circuit 140, and then generates the control signal INT indicating positively rotating the fan motor M to the driving circuit 140 after the reverse time. When the switching circuit 130 receives the voltage signal FRI indicating the second logic and determines that the clock signal CLK is not the oscillation signal, the switching circuit 130 generates the control signal INT indicating negatively rotating the fan motor M.

More specifically, the switching circuit 130 includes a counter 134, a detecting circuit 132, and a selector 136. The counter 134 receives the clock signal CLK and counts an oscillation number of the clock signal CLK (as the oscillation number TIMER shown in FIG. 5). When the oscillation number does not reach a predefined number, the counter 134 generates the control signal INT indicating negatively rotating the fan motor M. When the oscillation number reaches the predefined number, the counter 134 generates the control signal INT indicating positively rotating the fan motor M to the selector 136.

Figure 5:
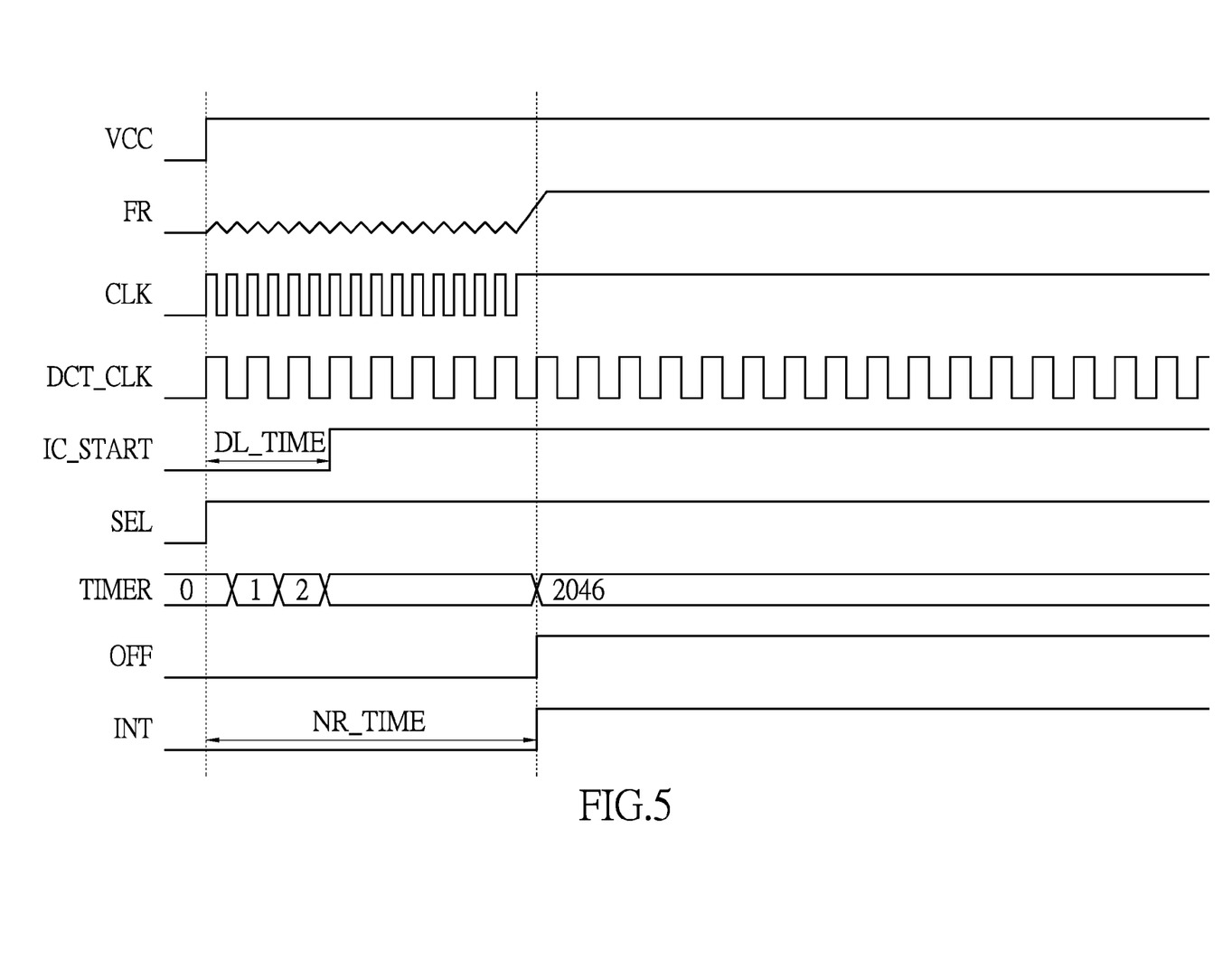
FIG. 5 is a wave diagram of an end connecting to a capacitor according to the positive and negative rotation control circuit shown in FIG. 4.
Figure 7:
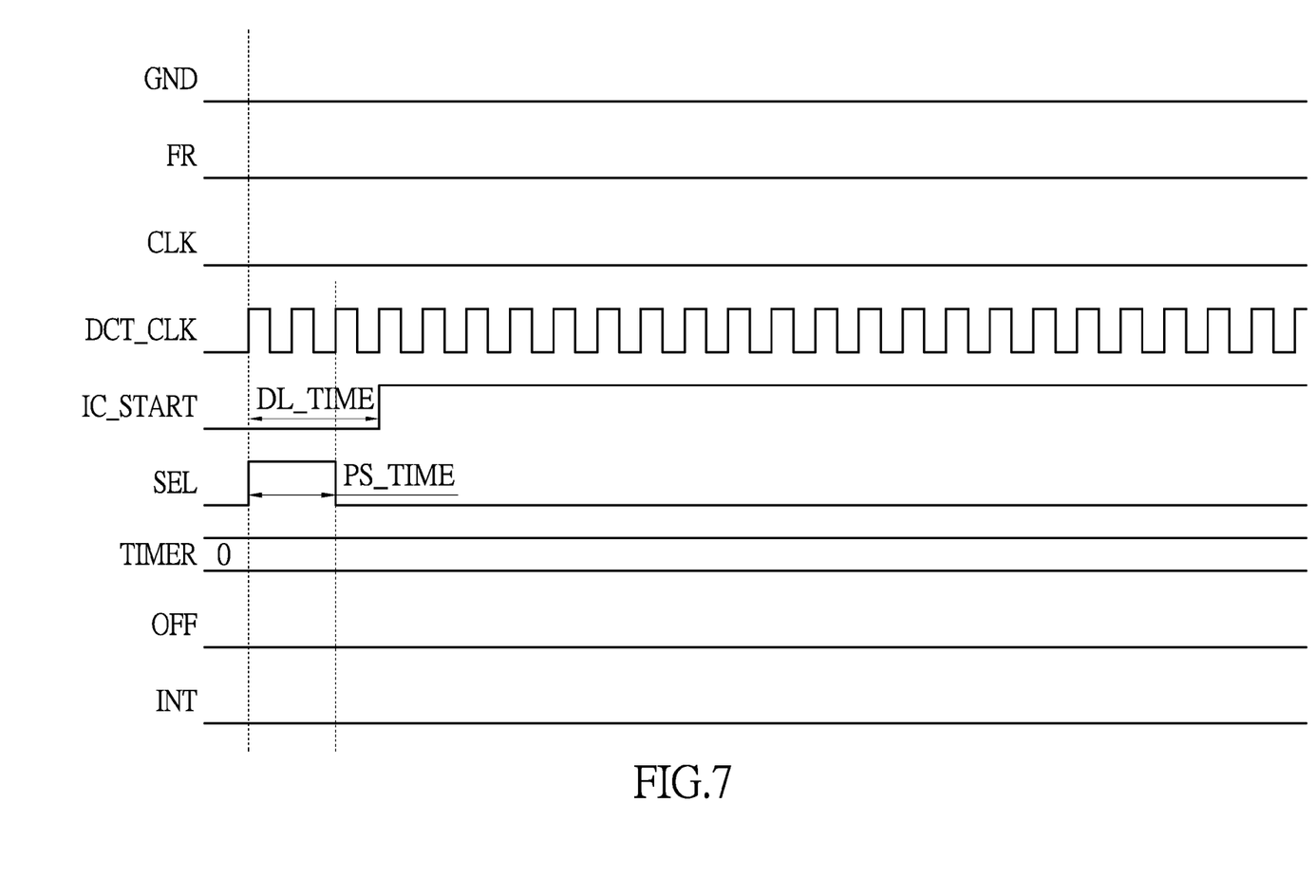
FIG. 7 is a wave diagram of an end connecting to a ground according to the positive and negative rotation control circuit shown in FIG. 4.

An oscillation number is taken as an example of the oscillation number TIMER as shown in FIG. 5 for illustration. In the instant disclosure, the predefined number is 2045. Next, the counter 134 counts the oscillation number of the clock signal CLK. When the oscillation number does not reach 2045 times (i.e., the predefined number), the counter 134 generates the control signal INT indicating negatively rotating the fan motor M to the selector 136. When the oscillation number reaches 2045 times, the counter 134 generates the control signal INT indicating positively rotating the fan motor M to the selector 136. An oscillation number is taken as an example of the oscillation number TIMER as shown in FIG. 7 for illustration. In the instant disclosure, the predefined number is equally 2045 times. Next, the counter 134 counts the oscillation number of the clock signal CLK. Because the clock signal CLK is not the oscillation signal, the oscillation number is 0. Meanwhile, the counter 134 generates the control signal INT indicating negatively rotating the fan motor M to the selector 136.

The detecting circuit 132 receives the voltage signal FRI and the clock signal CLK. When the detecting circuit 132 receives the voltage signal FRI indicating the first logic, the detecting circuit 132 generates the select signal SEL indicating the first logic to the selector 136. When the detecting circuit 132 receives the voltage signal FRI indicating the second logic and determines the clock signal CLK is the oscillation signal, the detecting circuit 132 generates the select signal SEL indicating the second logic to the selector 136. When the detecting circuit 132 receives the voltage signal FRI indicating the second logic and determines the clock signal CLK is not the oscillation signal, the detecting circuit 132 generates the select signal SEL indicating the second logic for a predefined time (as the predefined time PS_TIME shown in FIG. 7), and then generates the select signal SEL indicating the first logic after the predefined time. In the instant disclosure, the predefined time is less than the delay time (as the predefined time PS_TIME is less than the delay time DL_TIME shown in FIG. 7), to avoid the selector 136 generating the error control signal INT.

Figure 3:
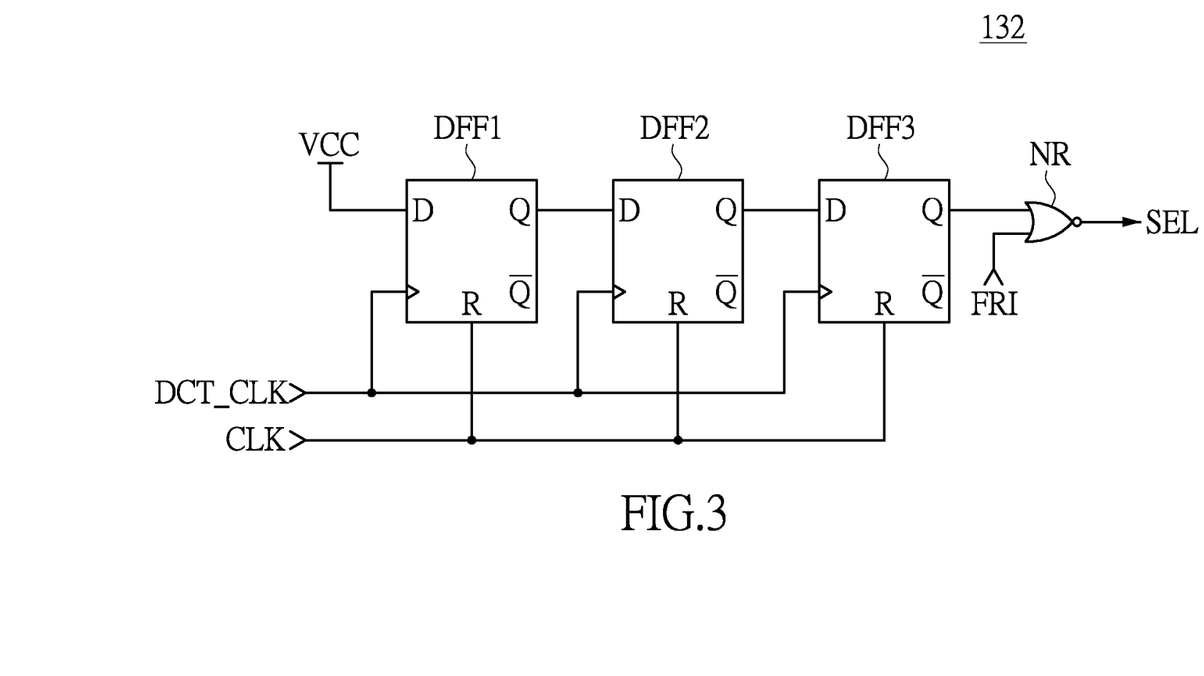
FIG. 3 is a diagram of a detecting circuit according to an exemplary embodiment of the instant disclosure.

In the instant disclosure, the detecting circuit 132 is composed of three D flip-flops and one NOR gate, which are D flip-flops DFF1, DFF2, DFF3, and NOR gate NR. As shown in FIG. 3, the input terminal of the D flip-flop DFF1 receives the supply voltage VCC. The output terminal of the D flip-flop DFF1 electrically connects to the input terminal of the D flip-flop DFF2. The output terminal of the D flip-flop DFF2 electrically connects to the input terminal of the D flip-flop DFF3. The output terminal of D flip-flop DFF3 electrically connects to an input terminal of the NOR gate NR. Another terminal of the NOR gate NR receives the voltage signal FRI, and the output terminal of the NOR gate NR electrically connects to the selector 136.

In addition, the clock input terminal of each D flip-flop DFF1-DFF3 receives an internal clock signal DCT_CLK. The reset terminal of each D flip-flop DFF1-DFF3 receives the clock signal CLK. In the instant disclosure, the internal clock signal DCT_CLK is the clock signal of the detecting circuit 132, so that the detecting circuit 132 can determine whether the clock signal CLK is the oscillation signal according to the internal clock signal DCT_CLK. Due to the detecting circuit 132 having three D flip-flops DFF1-DFF3, the detecting circuit 132 determines whether the low-voltage time of the clock signal CLK is too long during two periods of the internal clock signal DCT_CLK, to accordingly determine whether the clock signal CLK is the oscillation signal. When the low-voltage time of the clock signal CLK is too long, it means that the clock signal CLK is not the oscillation signal; otherwise, the clock signal CLK is the oscillation signal.

The selector 136 electrically connects to the counter 134 and the detecting circuit 132, to output the signal generated from the input stage circuit 120 or the signal generated from the counter 134 according to the select signal SEL. More specifically, when the selector 136 receives the select signal SEL indicating the first logic, the selector 136 receives the voltage signal FRI indicating the first logic as the control signal INT and transmits the control signal INT to the driving circuit 140. Moreover, when the selector 136 receives the select signal SEL indicating the second logic, the selector 136 transmits the control signal INT generated from the counter 134 to the driving circuit 140. Meanwhile, the driving circuit 140 rotates the fan motor M according to the control signal INT to drive the fan.

It is worth to note that when the counter 134 receives the clock signal as the oscillation signal (as shown in FIG. 5), the counter 134 generates the control signal INT indicating negatively rotating the fan motor M for a period of time, and then generates the control signal INT indicating positively rotating the fan motor M. Meanwhile, the driving circuit 140 negatively rotates the fan motor M for a period of time, and then positively rotates the fan motor M, so that the fan is positively rotated after being negatively rotated for a period of time.

As in the aforementioned description, the positive and negative rotation control circuit 100 positively or negatively rotates the fan motor M according to the end E1 connecting different external components or being floating. In particular, when the end E1 generates the oscillatory fan signal FR, the positive and negative rotation control circuit 100 negatively rotates the fan motor M for a period of time after the delay time DL_TIME. Then the positive and negative rotation control circuit 100 positively rotates the fan motor M to drive the fan. Therefore, the rotating fan exhausts the accumulated dust from the electronic device (i.e., negatively rotating the fan motor M for a period of time), and then dissipates heat the electronic device (i.e., positively rotating the fan motor M).

Figure 4:
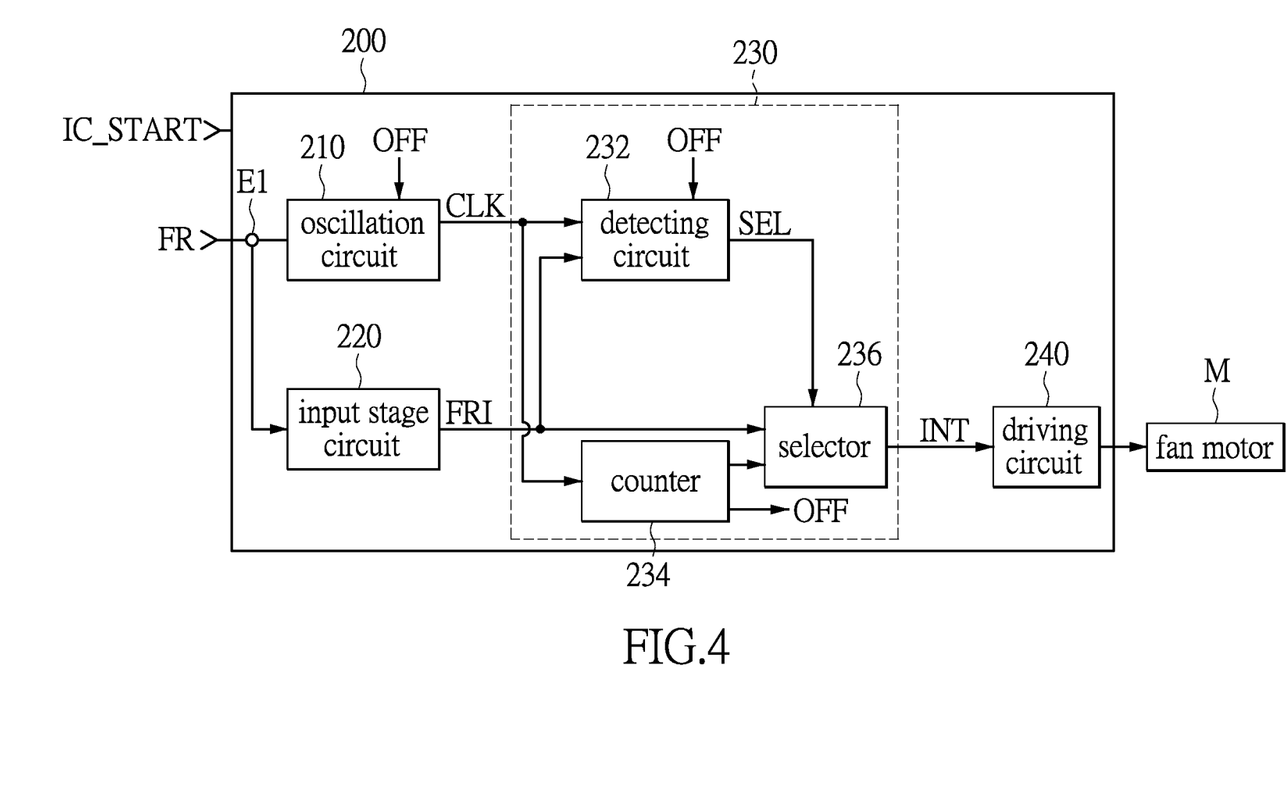
FIG. 4 is a diagram of a positive and negative rotation control circuit according to another exemplary embodiment of the instant disclosure.

Next, please refer to FIG. 4, which shows a diagram of a positive and negative rotation control circuit according to another exemplary embodiment of the instant disclosure. Compared with the positive and negative rotation control circuit 100 of the aforementioned disclosure, the difference of the positive and negative rotation control circuit 200 is that the counter 234 generates a stop signal OFF to the oscillation circuit 210 and the detecting circuit 232 after the reverse time, to fix the voltage level of the clock signal CLK. More specifically, the counter 234 generates the stop signal OFF to the oscillation circuit 210 and the detecting circuit 232 after the oscillation number reaching the predefined number, to fix the voltage level of the clock signal CLK. As shown in FIG. 5, the predefined number is 2045. The voltage level of the clock signal CLK is fixed to the high voltage after the counter 234 counting the oscillation number of the clock signal CLK to 2045 times. With respect to connection relationships and operations of the oscillation circuit 210, the input stage circuit 220, the switching circuit 230, the detecting circuit 232, the counter 234, the selector 236, and the driving circuit 240 in the positive and negative rotation control circuit 200 are the same as that of the oscillation circuit 110, the input stage circuit 120, the switching circuit 130, the detecting circuit 132, the counter 134, the selector 136, and the driving circuit 140 in the positive and negative rotation control circuit 100 shown in FIG. 1, and further descriptions are hereby omitted.

Operations of the positive and negative rotation control circuit 200 while the end E1 is connecting to the capacitor, the power supply, the ground, or being floating are described in the following paragraph. In the following disclosure, the positive and negative rotation control circuit 100 is started according to a start signal IC_START, and it then controls the fan motor M to operate after the delay time DL_TIME. In the counter 234, the predefined number is 2045. When the fan signal FR is the oscillation signal, the voltage level of the fan signal FR is set to less than the predefined voltage level of the input stage circuit 220.

Next, operation of the positive and negative rotation control circuit 200 while the end E1 is connecting to the capacitor is described. Please refer to FIG. 5 in conjunction with FIGS. 2-4. FIG. 5 shows a wave diagram of an end connecting to a capacitor according to the positive and negative rotation control circuit shown in FIG. 4. As shown in FIG. 5, when the end E1 of the positive and negative rotation control circuit 200 connects to the capacitor, the oscillation circuit 210 generates the oscillatory fan signal FR at the end E1, and then outputs the clock signal CLK corresponding to the fan signal FR. At present, the clock signal CLK is the oscillation signal. Due the voltage level of the oscillatory fan signal FR being set to less than the predefined voltage level of the input stage circuit 220, the input stage circuit 220 generates the voltage signal FRI with the low-voltage (not shown in FIG. 5). Meanwhile, the detecting circuit 232 determines that the clock signal CLK is the oscillation signal according to the internal clock signal DCT_CLK, to accordingly output the select signal SEL with the high-voltage. In addition, the counter 234 counts the oscillation number of the clock signal CLK. When the oscillation number does not reach 2045, the counter 234 generates the control signal INT with the low-voltage indicating negatively rotating the fan motor M. The time of the counter 234 counting from 0 to 2045 is called the reverse time NR_TIME. After the oscillation number reaches 2045, the counter 234 generates the control signal INT with the high-voltage indicating positively rotating the fan motor M.

Next, the selector 236 outputs the control signal INT generated from the counter 234 to the driving circuit 240 according to the select signal SEL with the high-voltage. The driving circuit 240 controls the fan motor M to operate after the delay time DL_TIME. Meanwhile, the driving circuit 240 negatively rotates the fan motor M for the reverse time NR_TIME according to the control signal INT. Then the driving circuit 240 positively rotates the fan motor M to drive the fan. It is worth to note that when the end E1 connects to the capacitor, the delay time DL_TIME is designed to be less than the reverse time NR_TIME, to ensure that the selector 236 does not negatively rotate the fan motor M during the delay time DL_TIME. After the counter 234 counts to 2045 times, the counter 234 generates the stop signal OFF to the oscillation circuit 210 and the detecting circuit 232. Meanwhile, the oscillation circuit 210 and the detecting circuit 232 stop operating and the voltage level of the clock signal CLK turns to high voltage, to avoid the oscillatory clock signal CLK interfering with other signals which are easily influenced.

Figure 6:
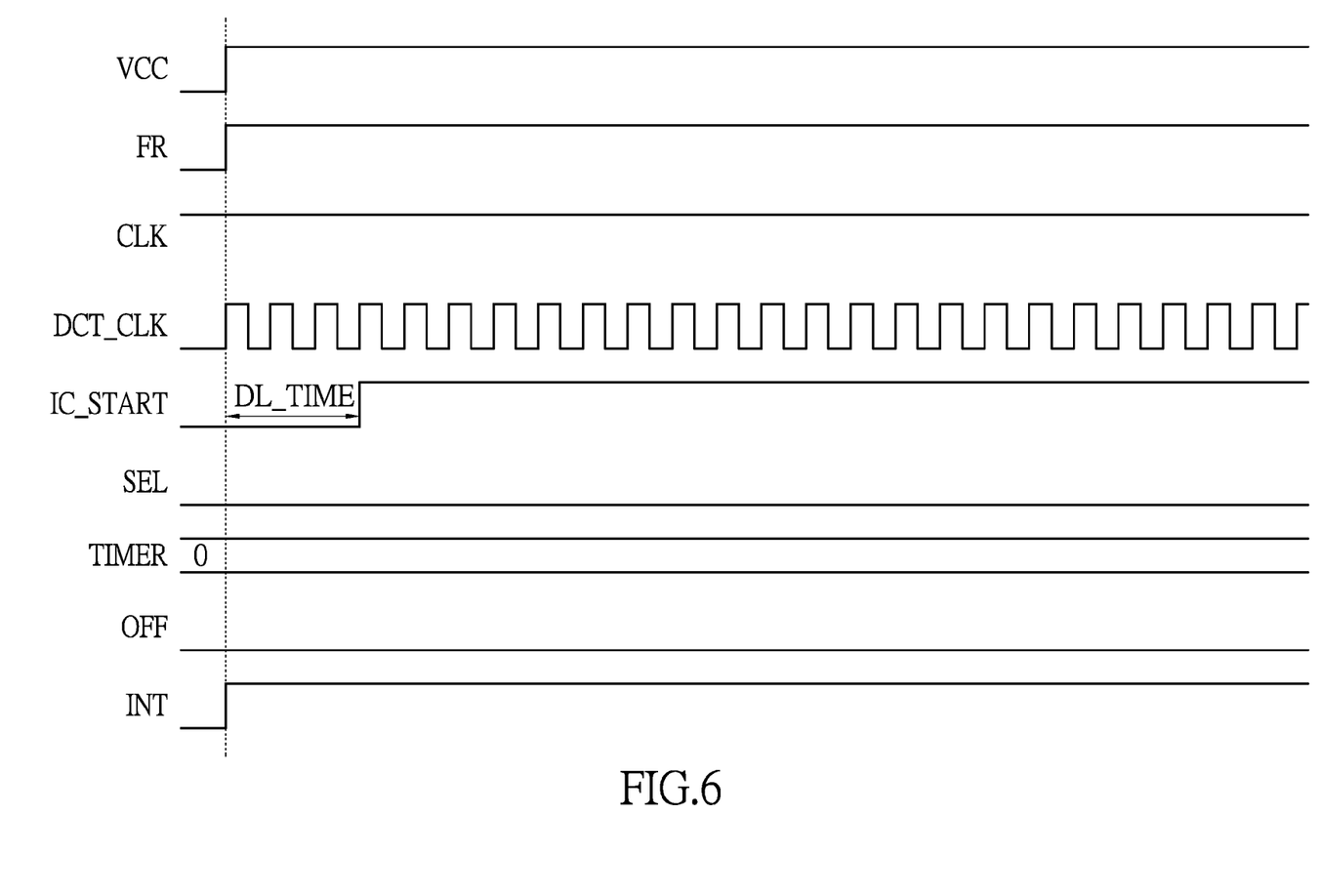
FIG. 6 is a wave diagram of an end connecting to a power supply according to the positive and negative rotation control circuit shown in FIG. 4.

Next, operation of the positive and negative rotation control circuit 200 while the end E1 is connecting to the supply voltage VCC is described. Please refer to FIG. 6 in conjunction with FIGS. 2-4. FIG. 6 shows a wave diagram of an end connecting to a power supply according to the positive and negative rotation control circuit shown in FIG. 4. As shown in FIG. 6, when the end E1 of the positive and negative rotation control circuit 200 connects to the power supply, the oscillation circuit 210 generates the fan signal FR with the high voltage at the end E1, and then outputs the clock signal CLK corresponding to the fan signal FR (i.e., the high-voltage). At present, the clock signal CLK is not the oscillation signal. Due the voltage level of the fan signal FR with the high-voltage being set to higher than the predefined voltage level of the input stage circuit 220, the input stage circuit 220 generates the voltage signal FRI with the high-voltage (not shown in FIG. 6). Meanwhile, the detecting circuit 232 generates the select signal SEL with the low-voltage according to the voltage signal FRI with the high-voltage. Because the clock signal CLK is the fixed high-voltage (i.e., the non-oscillation signal), the oscillation number of the clock signal CLK counted by the counter 234 is 0.

Next, the selector 236 selects the voltage signal FRI with the high-voltage generated from the input stage circuit 220 as the control signal INT according to the select signal SEL with the low-voltage, and then outputs the control signal INT to the driving circuit 240. Next, the driving circuit 240 controls the fan motor M to operate after the delay time DL_TIME. Meanwhile, the driving circuit 240 positively rotates the fan motor M to drive the fan according to the control signal INT. Because the counter 234 does not count to 2045 times, the counter 234 does not generate the stop signal OFF to the oscillation circuit 210 and the detecting circuit 232. At present, the voltage level of the clock signal CLK is the fixed high-voltage, to avoid the oscillatory clock signal CLK interfering with other signals which are easily influenced.

Next, operation of the positive and negative rotation control circuit 200 while the end E1 is connecting to the ground voltage GND is described. Please refer to FIG. 7 in conjunction with FIGS. 2-4. FIG. 7 shows a wave diagram of an end connecting to a ground according to the positive and negative rotation control circuit shown in FIG. 4. As shown in FIG. 7, when the end E1 of the positive and negative rotation control circuit 200 connects to the ground, the oscillation circuit 210 generates the fan signal FR with the low voltage at the end E1, and then outputs the clock signal CLK corresponding to the fan signal FR (i.e., the low-voltage). At present, the clock signal CLK is not the oscillation signal. Due to the voltage level of the fan signal FR with the low-voltage being set to lower than the predefined voltage level of the input stage circuit 220, the input stage circuit 220 generates the voltage signal FRI with the low-voltage (not shown in FIG. 7). Meanwhile, the detecting circuit 232 determines that the clock signal CLK is not the oscillation signal during two periods of the internal clock signal DCT_CLK. During two periods of the internal clock signal DCT_CLK (i.e., the period of the detecting circuit 232 determining whether the clock signal CLK is the oscillation signal), the detecting circuit 232 outputs the select signal SEL with the high voltage. After two periods of the internal clock signal DCT_CLK, because the detecting circuit 232 determines that the clock signal CLK is not the oscillation signal, the detecting circuit 232 outputs the select signal SEL with the low voltage. This means that the end E1 receives the fan signal FR with low voltage, so that the driving circuit 240 negatively rotates the fan motor M.

Next, the selector 236 outputs the voltage signal FRI with the low voltage generated from the input stage circuit 220 as the control signal INT according to the select signal SEL with the low-voltage, and then outputs the control signal INT to the driving circuit 240. Then the driving circuit 240 controls the fan motor M to operate after the delay time DL_TIME. Meanwhile, the driving circuit 240 negatively rotates the fan motor M to drive the fan according to the control signal INT. Because the counter 234 does not count to 2045 times, the counter 234 does not generate the stop signal OFF to the oscillation circuit 210 and the detecting circuit 232. At present, the voltage level of the clock signal CLK is the fixed low-voltage, to avoid the oscillatory clock signal CLK interfering with other signals which are easily influenced.

Figure 8:
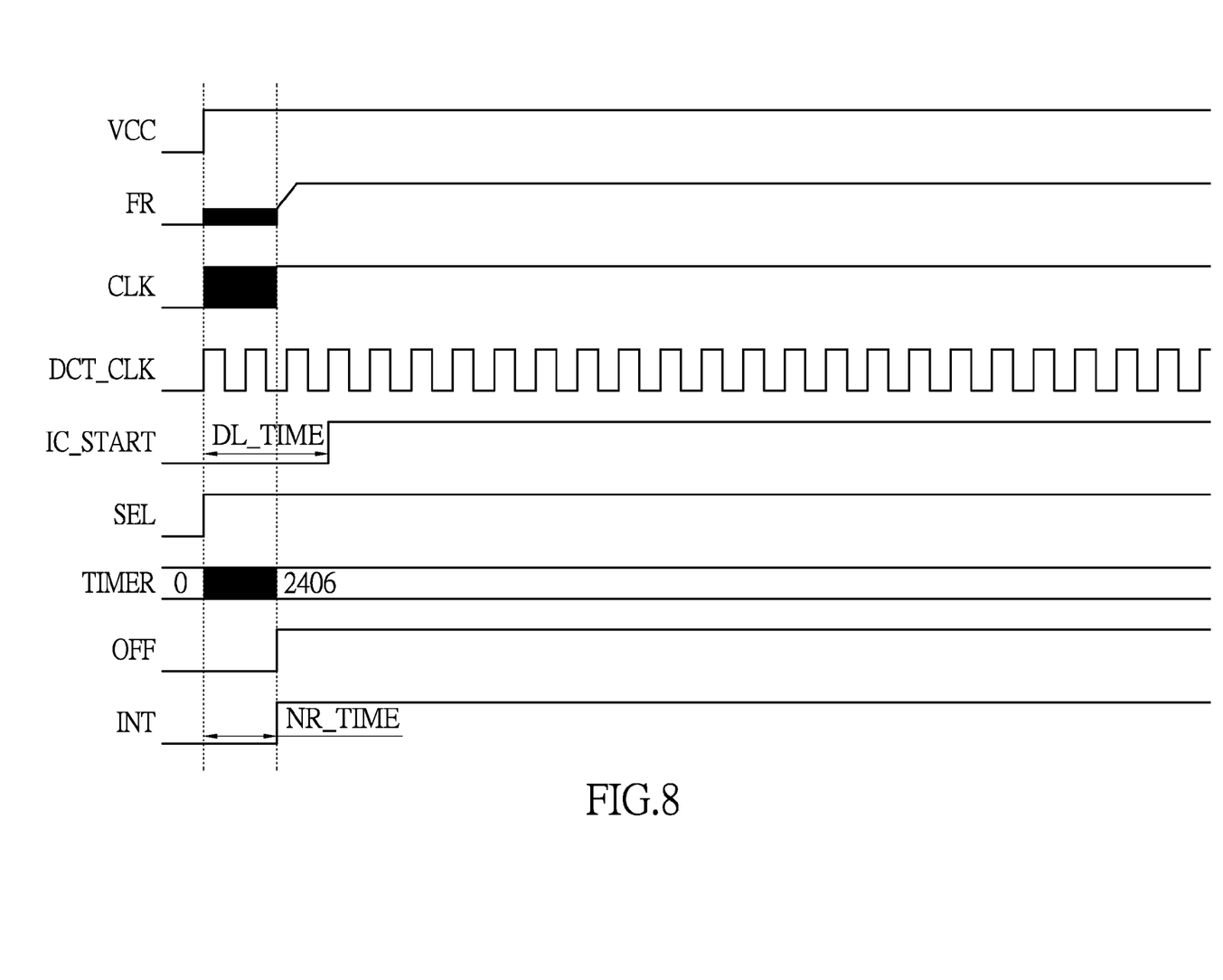
FIG. 8 is a wave diagram of an end being floating according to the positive and negative rotation control circuit shown in FIG. 4.

Next, operation of the positive and negative rotation control circuit 200 while the end E1 being floating is described. Please refer to FIG. 8 in conjunction with FIGS. 2-4. FIG. 8 shows a wave diagram of an end being floating according to the positive and negative rotation control circuit shown in FIG. 4. As shown in FIG. 8, when the end E1 of the positive and negative rotation control circuit 200 is floating, the end E1 generates a parasitic capacitance. Therefore, the oscillation circuit 210 charges or discharges the parasitic capacitance, so that the fan signal FR of the end E1 has the higher oscillation frequency, which is much higher than the oscillation frequency of the fan signal FR while the external element is the capacitor. Then the oscillation circuit 210 outputs the clock signal CLK corresponding to the fan signal FR. At present, the clock signal CLK is the oscillation signal with the high frequency. Because the voltage level of the oscillatory fan signal FR is set to be less than the predefined voltage level of the input stage circuit 220, the input stage circuit 220 generates the voltage signal FRI with the low-voltage (not shown in FIG. 8). At present, the detecting circuit 232 determines that the clock signal CLK is the oscillation signal according to the internal clock signal DCT_CLK, and then outputs the select signal SEL with high voltage. Besides, the counter 234 counts the oscillation number of the clock signal CLK. When the oscillation number does not reach 2045 times, the counter 234 generates the control signal INT with the low voltage indicating negatively rotating the fan motor M. After the oscillation number reaches 2045 times, the counter 234 generates the control signal INT with the high voltage indicating positively rotating the fan motor M.

Next, the selector 236 outputs the control signal INT generated from the counter 234 to the driving circuit 240 according to the select signal SEL with the high voltage. Due the reverse time NR_TIME being less than the delay time DL_TIME and the driving circuit 240 controlling the fan motor M to operate after the delay time DL_TIME, the driving circuit 240 positively rotates the fan motor M according to the control signal INT to drive the fan.

After the counter 234 counts to 2045 times, the counter 234 generates the stop signal OFF to the oscillation circuit 210 and the detecting circuit 232. Meanwhile, the oscillation circuit 210 and the detecting circuit 232 stop operating and the voltage level of the clock signal CLK turns to high voltage, to avoid the oscillatory clock signal CLK interfering with other signals which are easily influenced.

In summary, the exemplary embodiments of the instant disclosure provide a positive and negative rotation control circuit and fan system, which can positively or negatively rotate a fan motor according to an end connecting to different external components or being floating. In particular, when the end generates an oscillatory fan signal, the positive and negative rotation control circuit negatively rotates the fan motor for a period of time after the positive and negative rotation control circuit is started for a delay time, to execute the operation of exhausting the accumulated dust, so that a fan connecting to the fan motor may exhaust the accumulated dust from an electronic device. Then the positive and negative rotation control circuit positively rotates the fan motor to execute the operation of dissipating heat, so that the fan may dissipate heat in the situation of having less dust within the electronic device. Accordingly, the positive and negative rotation control circuit may enhance the heat dissipation effect of the fan.

The above-mentioned descriptions represent merely the exemplary embodiment of the instant disclosure, without any intention to limit the scope of the instant disclosure thereto. Various equivalent changes, alterations or modifications based on the claims of instant disclosure are all consequently viewed as being embraced by the scope of the instant disclosure.

What is claimed is:

1. A positive and negative rotation control circuit, which is started based on a start signal, and then configured for controlling a fan motor after being started for a delay time, and the positive and negative rotation control circuit comprising:
   an oscillation circuit, having an end connecting an external component or being floating, and configured for generating a fan signal at the end to transform the fan signal to a clock signal;
   an input stage circuit, electrically connected to the end of the oscillation circuit, and configured for generating a voltage signal based on the voltage level of the fan signal;
   a switching circuit, electrically connected to the oscillation circuit and the input stage circuit, and configured for outputting a control signal according to the voltage signal and the clock signal, wherein when the switching circuit receives the voltage signal indicating a first logic, outputs the control signal indicating positively rotating the fan motor, and when the switching circuit receives the voltage signal indicating a second logic, determines whether the clock signal is an oscillation signal, wherein when the clock signal is the oscillation signal, the switching circuit generates the control signal indicating negatively rotating the fan motor for a reverse time, and then generating the control signal indicating positively rotating the fan motor after the reverse time; and
   a driving circuit, electrically connected to the switching circuit, and configured for positively or negatively rotating the fan motor after the delay time according to the control signal.

2. The positive and negative rotation control circuit according to claim 1, wherein when the switching circuit receives the voltage signal indicating the second logic and determines that the clock signal is not the oscillation signal, the switching circuit generates the control signal indicating negatively rotating the fan motor.

3. The positive and negative rotation control circuit according to claim 1, wherein the switching circuit comprises:
   a counter, receiving the clock signal, and counting an oscillation number of the clock signal, wherein when the oscillation number does not reach a predefined number, the counter generates the control signal indicating negatively rotating the fan motor, and when the oscillation number reaches the predefined number, the counter generates the control signal indicating positively rotating the fan motor;
   a detecting circuit, receiving the voltage signal and the clock signal, wherein when the detecting circuit receives the voltage signal indicating the first logic, generates a select signal indicating the first logic, and when the detecting circuit receives the voltage signal indicating the second logic and determines that the clock signal is the oscillation signal, generates the select signal indicating the second logic; and
   a selector, electrically connected to the counter and the detecting circuit, wherein when the selector receives the select signal indicating the first logic, receives the voltage signal as the control signal and transmits the control signal to the driving circuit, and when the selector receives the select signal indicating the second logic, transmits the control signal generated from the counter to the driving circuit.

4. The positive and negative rotation control circuit according to claim 3, wherein when the detecting circuit receives the voltage signal indicating the second logic and determines that the clock signal is not the oscillation signal, the detecting circuit generates the select signal indicating the second logic for a predefined time, and then generates the select signal indicating the first logic after the predefined time, and the predefined time is less than the delay time.

5. The positive and negative rotation control circuit according to claim 1, wherein the oscillation circuit comprises:
   a charge-discharge circuit, having a charging element and a discharging element, the end configured between the charging element and the discharging element, and the charge-discharge circuit charges or discharges the external component through the end, to generate the fan signal at the end; and
   a clock generator, electrically connected to the charge-discharge circuit, and configured for receiving the fan signal to accordingly generate the clock signal.

6. The positive and negative rotation control circuit according to claim 1, wherein the external component is one of a capacitor, a power supply outputting a supply voltage, and a ground outputting a ground voltage.

7. The positive and negative rotation control circuit according to claim 1, wherein the counter generates a stop signal to the oscillation circuit and the detecting circuit after the reverse time, to fix the voltage level of the clock signal.

8. The positive and negative rotation control circuit according to claim 3, wherein the counter generates a stop signal to the oscillation circuit and the detecting circuit after the oscillation number reaching the predefined number, to fix the voltage level of the clock signal.

9. The positive and negative rotation control circuit according to claim 1, wherein the input stage circuit is a Schmitt trigger.

10. A fan system, having a fan motor and the positive and negative rotation control circuit according to claim 1, the fan motor configured for driving a fan, and the positive and negative rotation control circuit configured for outputting the control signal, to positively or negatively rotate the fan motor after the delay time.

* * * * *